United States Patent [19]
Hill

[11] 3,800,366
[45] Apr. 2, 1974

[54] PREFORMED ROLLER BONDED TO SHAFT BY DUAL ADHESIVES

[76] Inventor: Edward D. Hill, 11212 Edgewater Dr., Cleveland, Ohio 44102

[22] Filed: Dec. 29, 1971

[21] Appl. No.: 213,515

Related U.S. Application Data

[62] Division of Ser. No. 32,843, April 29, 1970, Pat. No. 3,673,040.

[52] U.S. Cl............. 29/132, 29/110, 101/348, 156/294, 156/303.1, 156/310, 156/327, 161/125, 161/139, 161/190, 161/216
[51] Int. Cl............................ B32b 1/00, B41f 1/46
[58] Field of Search .......... 161/139, 190, 218, 216, 161/221, 401, 125; 156/293, 294, 303.1, 310, 327; 29/110, 132; 101/335, 337, 353, 367, 368, 375, 376, 212, 248

[56] References Cited
UNITED STATES PATENTS

| | | | |
|---|---|---|---|
| 2,631,358 | 3/1953 | Hill | 161/218 X |
| 2,721,601 | 10/1955 | Spencer | 101/375 X |
| 3,673,025 | 6/1972 | Fukuyama et al. | 156/293 X |
| 3,340,115 | 9/1967 | Rubenstein | 117/94 |
| 2,263,285 | 11/1941 | Bolog | 101/375 X |
| 3,157,204 | 11/1964 | Phillips | 161/184 X |

Primary Examiner—George F. Lesmes
Assistant Examiner—Paul J. Thibodeau
Attorney, Agent, or Firm—Wesley B. Taylor

[57] ABSTRACT

A roller, such as a printing roller, is fabricated by sliding a cylindrical body having a longitudinally extending, substantially central opening over a rigid shaft designed to support the roller during rotation or the like. The roller is preferably cut to a desired length from a preformed, relatively long section of the material. A lubricating adhesive is used for the joint purpose of first lubricating the relative sliding movement between the cylindrical body and shaft during assembly and then adhering these parts together after assembly. In the preferred practice, a wet, polymerizable adhesive coats the opening of the cylindrical body, and a second different adhesive is used on the shaft. The lubricity of both adhesives contributes to the sliding of the roller relatively to the shaft, and subsequently the two adhesives form an adhesive bond between themselves and the parts to which they are applied.

5 Claims, 3 Drawing Figures

PREFORMED ROLLER BONDED TO SHAFT BY DUAL ADHESIVES

CROSS-REFERENCE TO RELATED APPLICATION

This application is a division of an application entitled, "Mounting Preformed Roller on Shaft," filed Apr. 29, 1970, Ser. No. 32,843, now U.S. Pat. No. 3,673,040. The earlier application claims a process for preparing rollers as disclosed herein.

BACKGROUND OF THE INVENTION

One popular technique in fabricating rollers having rotatable shafts is to cast the roller body in a mold designed to hold the shaft in position. For example, U.S. Pat. No. 2,536,323 to Spencer illustrates and describes a mold which is generally completely housed within a temperature control oven. The mold consists of a hollow cylinder within which are annular ribs to carry two spacer elements which define the ends of the roller and support a metallic roller core therebetween. A melted resin such as polyvinyl chloride is cast in the mold about the metal core and between the end spacers and then allowed to solidify. Usually, the resulting cast roller is not sufficiently true for use, and it must be ground to a desired diametral size.

This technique is limited to producing only one size of roller from each mold as determined by the size of that mold. If other sizes are needed, either as to different lengths or widths, different molds must be fabricated. Further, casting a melted resin directly about a metal core or mandrel often does not result in good adherence between the solidified resin and the metal. This is particularly true of polyvinyl resins such as polyvinyl chloride. Polyvinyl resins have been found to have properties which adapt them for use as printing rollers. Such resins can be ink-attractive and ink-resistant and have a natural tack. However, polyvinyl resins do not have a natural adherence to metals and are difficult to bond well to metal shafts or mandrels.

In my prior U.S. Pat. No. 2,631,358, it is suggested to coat a metal mandrel or shaft with a suitable adhesive such as polyvinyl chloride or polyvinyl acetate. While the coating on the shaft is still wet, the material for the roller body is cast as a melt about the shaft in any suitable mold, such as the mold illustrated and described in the cited U.S. Pat. No. 2,536,323 to Spencer. But this technique again involves molds and is limited to providing a different size mold for each different sized roller desired.

In some cases, as in U.S. Pat. No. 3,139,826 to Rainwater, it has been proposed to fabricate an inking roller by drilling a solid bar of plastic polymer material to form a bore therein having a diameter slightly less than the diameter of a shaft on which it is to be mounted. This forms an interference when the drilled bar of plastic polymer material is press-fitted onto the shaft. In practice, the extent of interference must be kept within a relatively small tolerance. If there is too much interference, the shaft and polymer material can be pressed together only with difficulty. If there is no enough interference, the roller can be pushed over the shaft fairly easily, but there is not a sufficient frictional grip between the roller and shaft such that slippage can result at times.

A principal object of the present invention, therefore, is to provide a process of forming a roller and shaft construction and the resulting product in which preformed sections of roller material are used, and in which a preformed roller body is easily mounted around a supporting shaft without sacrifice of good adhesion therebetween.

SUMMARY OF THE INVENTION

In accordance with the present invention, molds are not used to form the roller or cylindrical body precisely to the length desired. Instead, the roller body is formed in relatively long sections. For example, the roller body can be extruded for appreciable lengths by means known in the art, leaving a longitudinally extending, substantially central opening. Coils of the roller body material can be stored until needed. Then a desired length is cut, either relatively long or relatively short or of an intermediate length, to meet diverse requirements.

The preformed roller, when cut to length, is then mounted on a rigid shaft by inserting the shaft in the opening of the roller and moving the shaft and roller relatively to each other. In the present invention, the relative movement between shaft and roller body is lubricated by an adhesive applied, for example, along the central opening of the roller. Moreover, the need for concern about the extent of interference between the roller and shaft is minimized by the same lubricant adhesive which, after assembly of roller and shaft, bonds them to each other. Preferably, the adhesive is liquid as applied and polymerizable to a solid adhesive form after assembly of the parts.

In one form, two different kinds of adhesives are used to adhere the preformed roller onto a rigid shaft. In this case, in addition to the polymerizable, liquid adhesive, a resin such as a hot melt of a thermoplastic resin is coated on the shaft and allowed to solidify. The resulting resin coat reduces the frictional draft between the shaft and roller body when they are moved relatively to each other as described to mount the roller body about the shaft. A thermoplastic resinous coating on the shaft is also helpful in creating a tight bond with the resin contained along the opening in the roller.

BRIEF DESCRIPTION OF THE DRAWINGS

In the accompanying drawings, the thicknesses of the adhesive coatings have been greatly exaggerated for purposes of illustration.

DESCRIPTION OF THE PREFERRED EMBODIMENTS

Figure 1:
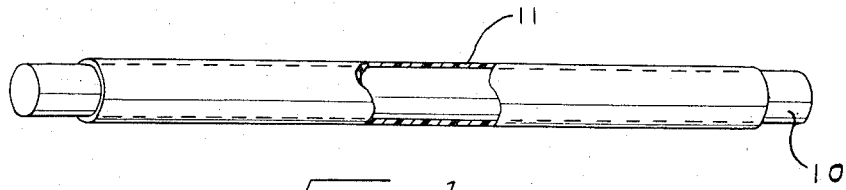
FIG. 1 is a side, perspective view of a rigid shaft having a coating of a solid lubricating adhesive.

In the preferred practice, two different adhesives are used, one on each of the roller and shaft. Best results are obtained when at least one of the adhesives is a liquid, that it may wet the part which it coats. This especially lubricates a sliding fit of roller body over the shaft. In order effectively to remove the liquid and provide a good bond, the liquid adhesive is preferably polymerizable. The other adhesive is preferably a thermoplastic resin which may be applied as a hot melt and allowed to solidify. The thermoplastic resin readily fills any minute nicks or cavities on the shaft and furnishes a relatively smooth, slippery surface over which the roller body slides.

While either type of adhesive may be applied to either the shaft or roller (the remaining adhesive being applied to the companion part), it is preferred to coat the thermoplastic resin on the shaft and to apply the liquid, polymerizable adhesive along the longitudinally extending opening of the roller body.

The polymerizable, liquid adhesive may be selected from a group of resins comprising phenol-formaldehyde, phenol-furfural, melamine-formaldehyde, urea formaldehyde, polyesters, and the like. However, the preferred polymerizable, liquid adhesive is an epoxy resin. Such a resin is, of course, characterized by the epoxy group:

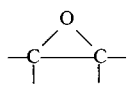

and preferably contains two of such groups. The remaining structure of the epoxy compound is not found to be critical. The epoxy compounds of the present invention may be at least bifunctional with respect to the epoxy groups, and they may moreover have a functionality greater than 2. The epoxy compound may be of monomeric or polymeric form but is preferably in polymeric form, although, as initially used, the polymer is still in the liquid state.

More particularly, by "epoxy resin" is meant the reaction products of polyfunctional halohydrins (for example, epichlorhydrin) with polyhydric alcohols and/or phenols (for example, Bisphenol A) to produce polyglycidyl ethers of polyhydric alcohols, and especially dihydric alcohols, and glycidyl ethers of bisphenols. The typical formula is usually represented as:

wherein $R_3$ represents a divalent hydrocarbon radical of dihydric phenol, for example:

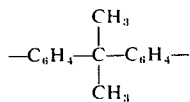

and wherein $n$ represents the extent of polymerization as determined by the epoxy equivalent which may range from about 140 to about 4,000. By the epoxy equivalent is meant the average number of 1,2-epoxy groups contained in the average molecule. It is expressed as the grams of the polymeric material or resin containing one gram equivalent of epoxide. Several suitable polymers or resins of this type are available on the market, such as those sold under the trademark "Epon."

If desired, it is possible to extend the epoxy resin with a polysulfide. In general, the polysulfide may be a polyalkylene polysulfide and especially the polyalkylene-polyetherpolysulfides. Polysulfides useful in the present invention are liquid at room temperature (about 75°F.) and have a molecular weight within the range of about 500 to about 4,000. Such liquid polymers are commercially available under the trademark "THIOKOL."

It is within the contemplation of the invention to add other ingredients to the liquid adhesive, such as catalysts known in the art to hasten the polymerization of the polymerizable adhesive. For example, from about one to about five per cent by weight of the polymerizable adhesive may comprise m-dinitrobenzene.

The polymerizable resin may be applied as hereinafter described while in a relatively low state of polymeric growth, that is, while still liquid. Alternately, if the extent of polymeric growth is substantial (but not complete) the polymerizable resin may be applied from known solvents therefor.

The thermoplastic adhesive may be selected from a group of resins comprising cellulose acetate, fluorocarbons such as polytetrafluoroethylene, nylon, polyethylene, polypropylene, polystyrene, polyvinyl chloride, polyvinyl acetate, polyvinylidene chloride, polyvinyl butyral, polyvinyl alcohol, copolymers of such vinyl polymers, and the like. However, the preferred thermoplastic resins are the polyacrylates. A wide variety of polyacrylates may be employed. The acrylate resin used is initally in liquid form at room temperatures (about 75°F.) and, accordingly, there is no criticality as to the extent of polymeric growth of the polyacrylate as long as it is still liquid. Desirably, the polyacrylate resin is a polymer formed from a monomer selected from the group consisting of the lower alkyl esters of acrylic acid and of methacrylic acid. Exemplary of these polyacrylate resins contemplated are those characterized by the formula:

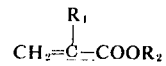

wherein $R_1$ is selected from the group consisting of hydrogen and methyl, and $R_2$ is an alkyl group of one to

four carbon atoms. However, it is not intended to exclude by the term "polyacrylate resin" those polyacrylates which are formed from hydroxyl-substituted acrylates or still other substituted acrylates. One polyacrylate of the general type described that has been found to be very satisfactory is sold under the trademark "Paraplex." This acrylate is a clear liquid having a specific gravity at 25°C. of 1.10 and a viscosity at the same temperature of 9 to 11 centipoises.

The roller body itself may comprise natural rubber, or a synthetic resin such as polyvinyl chloride as described in my U.S. Pat. No. 2,631,358; or a glue based roller having a surface layer comprising a polyalkylene polysulfide resin as disclosed in my U.S. Pat No. 2,538,751; or a roller composed of homopolymers and copolymers of 1-olefins as disclosed in U.S. Pat No. 3,139,826 to Rainwater. However, a preferred class of roller material comprises the polyurethanes. Any suitable formulation may be used to produce the polyurethane rubber. For example, suitable formulations and starting materials for polyurethanes are disclosed in U.S. Pats. Nos. 2,620,516; 2,621,166; 2,729,618; 2,764,565; and 2,778,810, such patents hereby being incorporated by reference.

Generally a polyurethane is prepared by reacting an organic compound having reactive hydrogen atoms, such as for example a polyester, a polyalkylene-ether glycol, a polyesteramide, a polyalkylene-thioether glycol, and the like with an organic polyisocyanate. Various compounds which may serve as the defined organic compound and polyisocyanate are disclosed in the cited patents. Suitable activators, such as those also disclosed in the mentioned patents, may be used in forming the polyurethane.

One feature of using a cylindrical roller body composed of polyurethane is that the body may be used at relatively low durometer ratings as formed without grinding or "truing" its surface. The unground surface of the polyurethane has, for example, a material tackiness which very appreciably aids the acceptance and transfer of ink, as described for example in my prior U.S. Pat. No. 3,387,074 in which polyurethanes are used in fabricating an offset blanket. If the surface of the polyurethane is abraded as by grinding in order to bring its thickness or size within dimensional tolerances, this inherent tackiness is reduced.

For most applications, the roller body may have a Shore A durometer rating from about 10 to about 50, a rating of about 25 to about 30 being preferred for ink-transferring functions.

Referring to the figures, a metal shaft 10 is coated with a layer 11 of a thermoplastic resin such as polymethyl methacrylate. The resin is first heated to a temperature sufficient to convert it to a hot melt and then coated on the shaft in any convenient manner. The resin can be allowed, for example, to run down the shaft while it is turning; or the shaft can be dipped in the melted resin which is then allowed to drain from the shaft to leave a substantially uniform coat; or the melt can be wiped on the shaft, etc. Thickness is not critical. The layer 11 can be, for instance, from about 10 mils to about 150 mils in thickness.

Figure 2:
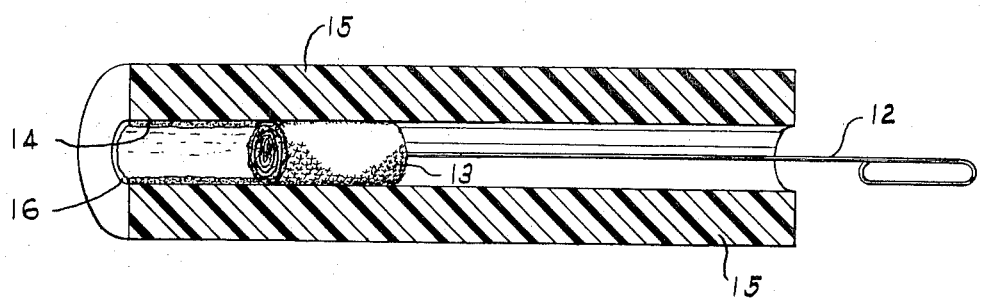
FIG. 2 is a longitudinal, perspective section of a cylindrical roller body having a central opening being coated with a liquid, lubricating adhesive by means of a swab.
Figure 3:
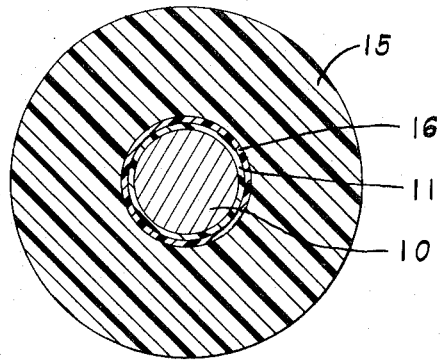
FIG. 3 is a transverse, radial section of the roller body of FIG. 2 after it has been mounted on the shaft of FIG. 1.

Similarly, a polymerizable adhesive can be applied along the longitudinally extending opening in a roller body by any convenient means. In FIG. 2, a wire 12 pulls a swab 13 through the center opening 14 of a polyurethane roller 15 which has been previously cut from a preformed, extended length of the same material. The swab is saturated with an epoxy resin so as to deposit a layer 16 of the resin along the opening 14. The thickness of this layer is also not significant and may range from about 10 mils to about 100 mils.

When each part has been coated as described, the shaft 10 is inserted in the opening 14 of the roller body, and the parts moved relatively to each other to move the roller about the shaft. The lubricity of both adhesive 11 and adhesive 16 facilitates this relative movement. Adhesive 11 is hard, dry and slippery, while adhesive 16 is still wet. Thereafter the polymerizable adhesive 11 is set. This resin may be formulated by known means to have a pot life of about 15 minutes to about 25 minutes at room temperatures. Elevated temperatures hasten the polymerization and setting of the adhesive coat 11 and can be used if desired. The setting of the polymerizable resin effects a bond between the adhesives 11 and 16 and as well between their respectively coated parts to secure the roller 15 with respect to the shaft 10.

It is within the contemplation of the invention to use only one adhesive. In this case, just the wet polymerizable resin, exemplified by the epoxy resin, is used either on the shaft 10 or within the opening of the roller body 15 as described. The procedure is otherwise the same.

The rollers produced in accordance with the invention may be used for any purpose rollers are normally employed, such as transfer rollers, power-driven or power-transfer rollers, etc. However, inking rollers such as printing and graining rollers are especially contemplated.

Use of the present invention avoids the molding or casting of rollers in a mold designed for a particular size. In contrast, the present roller material can be extruded for appreciable lengths, stored in coils, and later cut to any length desired. In assembling a roller body and shaft in accordance with the present invention, an unset adhesive is used for the dual purpose of facilitating the slipping of the roller about the shaft and then, when set, securing the roller to the shaft. Alternatively, two adhesives may be used, one on the shaft and one on the roller for this purpose.

While the foregoing discloses several embodiments of the present invention, it is understood that it may be practiced in still other forms within the scope of the following claims.

I claim:

1. A roller comprising a shaft, a precut, resinous elastic cylindrical body having a longitudinally extending opening mounted on the shaft, and dual adhesive means between the shaft and body contacting one another to form an adhesive bond therebetween, said dual adhesive means defining substantially concentric, tubular coatings, one adhesive means coating said shaft and the other adhesive means coating said longitudinally extending opening to bond the cylindrical body to said shaft, one of the adhesive means comprising a thermoplastic, hot melt material, and the other of the adhesive means comprising a thermoset reaction product of a polymerizable liquid, whereby both of said adhesive means prior to polymerization of said liquid adhesive means are adapted to exhibit a compatible lubricity in mounting said roller on said shaft by a lengthwise relative movement therebetween, and subsequently after polymerization of said liquid adhesive means to effect a bond between themselves and to said shaft and cylindrical body, respectively.

2. The roller of claim 1 wherein said thermoplastic hot melt material coats said shaft.

3. The roller of claim 1 wherein said thermoset reaction product of a polymerizable liquid coats said longitudinally extending opening.

4. The roller of claim 1 wherein said thermoplastic hot melt material is a polyacrylate resin.

5. The roller of claim 1 wherein said thermoset reaction product of a polymerizable liquid is an epoxy resin.

* * * * *